United States Patent [19]
Saito

[11] 4,152,940
[45] May 8, 1979

[54] VIBRATION DETECTOR
[75] Inventor: Makoto Saito, Tokyo, Japan
[73] Assignee: Oki Electric Industry Co., Ltd., Tokyo, Japan
[21] Appl. No.: 841,116
[22] Filed: Oct. 11, 1977
[30] Foreign Application Priority Data

Oct. 15, 1976 [JP] Japan .................................. 51-122900
Dec. 25, 1976 [JP] Japan .................................. 51-155676
May 9, 1977 [JP] Japan .................................. 52-52128

[51] Int. Cl.$^2$ ............................................. G01P 15/08
[52] U.S. Cl. ................................................... 73/653
[58] Field of Search ..................... 73/517 R, 653, 655; 340/17 R, 261, 262, 669, 689, 683, 566; 250/231 R

[56] References Cited
U.S. PATENT DOCUMENTS

| 3,224,279 | 12/1965 | Galli et al. .................. 73/517 R UX |
| 3,961,185 | 6/1976 | Brokenshire et al. ......... 73/517 R X |

OTHER PUBLICATIONS

J. I. Hamrick et al., Optical Displacement Measuring Device, IBM Technical Disclosure Bulletin, Dec. 1961, vol. 4, No. 7, p. 85.

Primary Examiner—Anthony V. Ciarlante
Attorney, Agent, or Firm—Armstrong, Nikaido, Marmelstein & Kubovcik

[57] ABSTRACT

A vibration detector having a pendulum, means for sensing the vibration of the pendulum, and a means for damping the vibration of said pendulum has been found. The pendulum has a light source which provides a parallel light beam, and the parallel light beam focuses at a light receiving plane. A beam sensor mounted at the light receiving plane, said beam sensor having a plurality of cells, senses the presence of the light beam on each cell. The parallel light beam illuminates the specific cell depending upon the vibration of the pendulum, and the illuminated cell provides an electric output signal indicating the reception of the beam. Thus, the vibration is detected as the electrical output of each cell. The relationship of the light beam and the light receiving plane can be inversed, that is to say, the light beam can be fixed and the light receiving plane can be mounted on the pendulum.

8 Claims, 16 Drawing Figures

VIBRATION DETECTOR

BACKGROUND OF THE INVENTION

The present invention relates to a vibration detector, in particular, relates to a vibration detector which detects the condition that two out of three components of a composite vibration have reached a predetermined value.

The present vibration detector can be utilized as a seismograph for measuring an earthquake. Usually, the vibration of an earthquake has three independent components, however, the analysis of two components in an horizontal plane is enough for determining earthquake damage.

There have been known some vibration detectors, some of which are as follows.

(1) Vibration Detector (A)

Two sets of conventional vibrometers which detect only one component are appropriately arranged so that two components may be detected. The electric output from these two sets of vibrometers is delivered to the square root circuit and it is then determined whether the output thus produced has reached the set point.

(2) Vibration Detector (B)

A pendulum which is allowed to vibrate within an approximate plane doubles as a movable electrode. This pendulum in the stationary position is positioned in the center of a cylindrical fulcrum which is the fixed electrode. As the vibration reaches the set point, the movable electrode makes contact with the fixed electrode, and the circuit is closed to provide an electrical signal.

(3) Vibration Detector (C)

In the vibration detector (B) in place of the movable electrode and the fixed electrode, multiple numbers of electric contacts are provided either on the circumference of the pendulum or on that of the cylindrical fulcrum of the pundulum. As the vibration reaches the set point the circuit is closed at the electric contact points.

The following are detailed descriptions of each of the above mentioned three different prior arts used in seismography to detect horizontal components of earthquake motion.

FIG. 1 depicts an example of the first model (detector A). In FIG. 1, 1a is the seismograph converter installed to detect the east-west component of the earthquake motion, 1b is the other seismograph converter for detecting the south-north component of the earthquake motion, 3a is the square root circuit, 4a is the amplitude detector, 5a is the relay circuit, 6a is the relay output.

This vibration detector detects the movement of the ground in a horizontal plane. The seismogtaph converter 1a for detecting the east-west component delivers electrical output corresponding to the amplitude of the east-west vibration of the earthquake motion to the square root circuit 3a. The seismograph converter 2a for detecting the south-north component delivers electrical output corresponding to the vibration of the south-north component of the earthquake motion to the square root circuit 3a. The square root circuit 3a computes the square root of the above two inputs, and applies electric output corresponding to the amplitude of the vibration of the earthquake in the horizontal plane to the amplitude detector 4a. The amplitude detector 4a generates output, when an electrical input exceeds a predetermined value. This output actuates the relay circuit 5a, and the relay contact output 6a provides an output signal. If the relay circuit 5a is a self-hold type, the above mentioned output signal is maintained after the vibration stops.

However, this type of device requires two sets of seismograph converters 1a and 1b. Furthermore, electronic circuits of various functions are needed. Therefore, this device is complex and high priced.

FIG. 2 shows the second model (vibrator B). In FIG. 2, the reference numeral 1b is a platform, 2b is a fulcrum, 3b is a pendulum, 4b is a movable electrode, 5b is a fixed electrode, 6b is an insulation seat, 7b and 8b are cables, 9b is a relay circuit, 10b is a relay output.

The platform 1b is positioned horizontally. The movable electrode 4b attached to the pendulum 3b is placed in the center of the fixed electrode 5b in the stationary condition. If there is a vibration, the relative position of the pendulum 3b and the platform 1b changes. The pendulum 3b is supported by the fulcrum 2b so that it may move freely in all directions within a horizontal plane. Therefore, provided the magnitude of the earthquake motion is limited within the amplitude of the inner diameter of the fixed electrode, the movable electrode 4b will come into contact with some part of the interior wall of the fixed electrode 5b.

Since the fixed electrode 5b and the movable electrode 4b are connected with the relay circuit 9b by the cables 7b and 8b, the relay circuit 9b is actuated by the contact of the movable electrode 4b and fixed electrode 5b, and the relay output 10b indicates that the movable electrode 4b contacts with the fixed electrode 5b. The fact that the earthquake motion has reached the set point is detected in this manner.

Although this device is of simple configuration, the size of the fixed electrode 5b determines the set point and no modification of the set point can be made.

FIG. 3(A) and FIG. 3(B) explain the model 3 (detector C). In those figures, 1c is a housing, 2c is a pendulum, 3c are contacts, 4c is a set point adjustable screw, 5c is a relay circuit, 6c is a relay output.

The housing 1c is positioned horizontally. The pendulum 2c is standing upright in a stationary condition. The multiple contacts 3c provided on the circumference of the upper part of the pendulum 2c are directly confronting the set point adjustment screws 4c. The distance between these contacts 3c and their respective set point adjustment screws 4c is identical throughout. The set point adjustment screws 4c may be adjusted so that the contact 3c will make a circuit precisely at a point where the value of horizontal motion is to be detected. When the earthquake motion reaches the set point, any one of the multiple contacts 3c makes a circuit, whereby the relay circuit 5c is actuated. Then the relay output 6c becomes inverted from its stationary condition. That the earthquake motion has reached the set point may be detected in this manner. This device has an advantage in that its set point can be altered by its set point adjustment screw 4c. However, this means that a very careful adjustment of the multiple numbers of the set point adjustment screws 4c is essential. The numbers of the contacts 3c and the set point adjustment screws 4c determine set point errors. Therfore, if errors are to be reduced, the number of the contacts should be increased resulting in increased adjustment work which is troublesome.

SUMMARY OF THE INVENTION

It is an object, therefore, of the present invention to overcome the disadvantages and limitations of prior vibration detectors by providing a new and improved vibration detector.

The other object of the present invention is to provide a vibration detector the set point of which can be easily adjusted in all directions.

The above and other objects are attained by a vibration detector having a stationary housing, a pendulum vibratably mounted in said housing, a light source which provides a vertical light beam to or from the pendulum, a beam sensor having a plurality of cells to receive said light beam, and each cell of said beam sensor being arranged to provide an electrical signal according to the point that the light beam illuminates depending upon the vibration of said pendulum.

BRIEF DESCRIPTION OF THE DRAWINGS

The foregoing and other objects, features, and attendant advantages of the present invention will be appreciated as the same become better understood by means of the following description and the accompanying drawings wherein.

DESCRIPTION OF THE PREFERRED EMBODIMENTS

Figure 1:
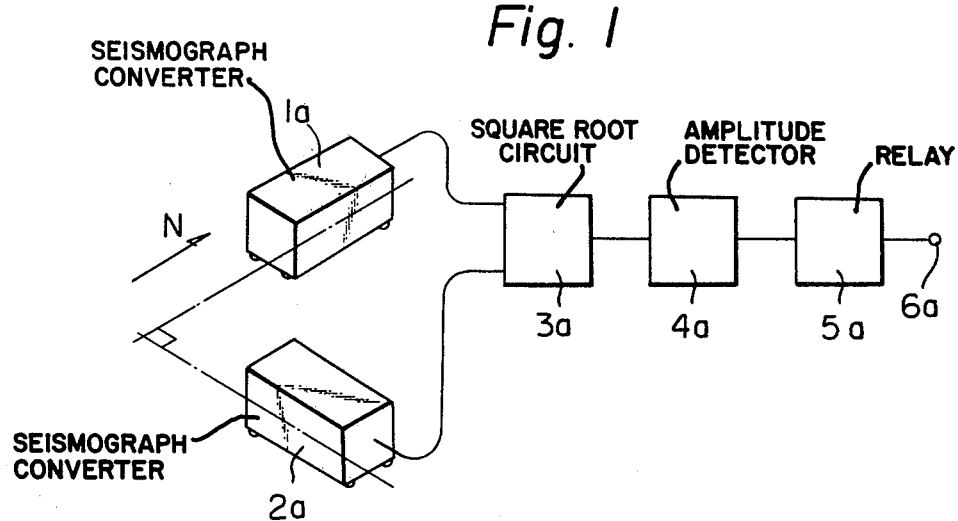
FIG. 1 shows the block-diagram of the prior vibration detector.
Figure 2:
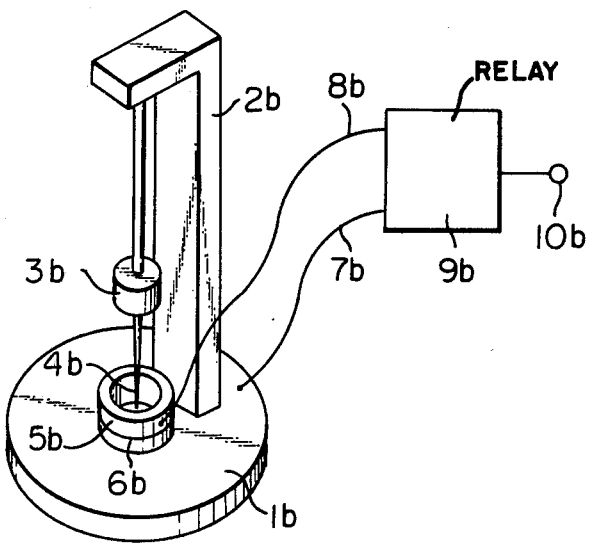
FIG. 2 shows the structure of another prior vibration detector.
Figure 3A:
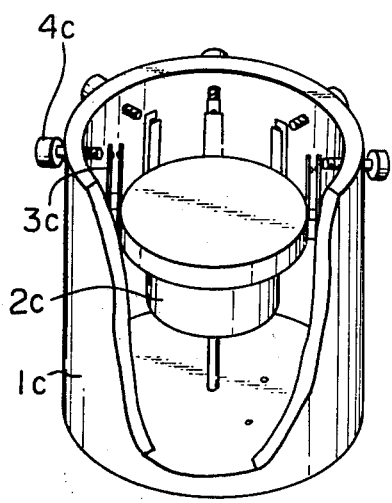
FIG. 3(A) show the structure of another prior vibration detector.
Figure 3B:
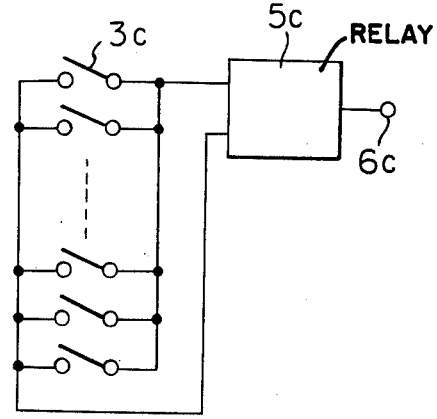
FIG. 3(B) is the circuit diagram of the vibration detector in FIG. 3(A)
Figure 4A:
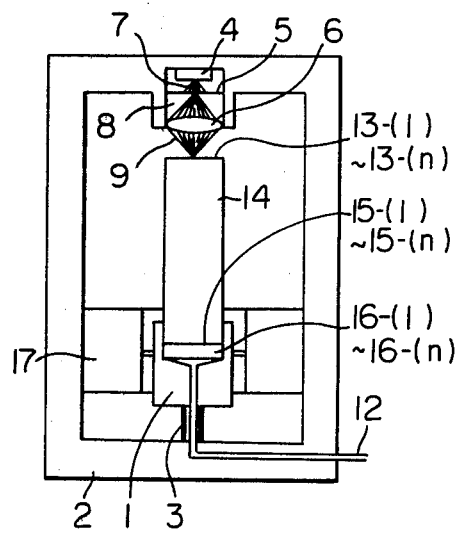
FIG. 4(A) and FIG. 4(B) show the structure of the present vibration detector.
Figure 4B:
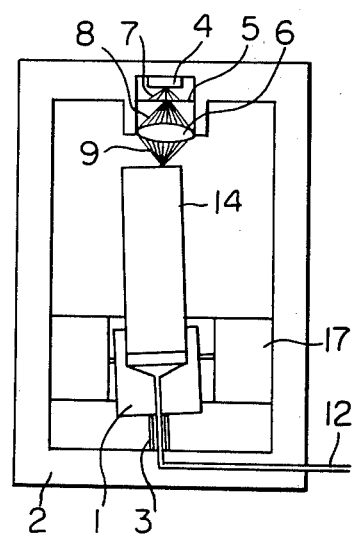

FIGS. 4(A) and 4(B) show the first embodiment of the present vibration detector, in which FIG. 4(A) shows that the pendulum is still and FIG. 4(B) shows that the pendulum is vibrating. In those figures, the reference numeral 1 is the bob of the inverted pendulum, 2 is the housing, 3 is the supporting spring of the pendulum, 4 is the light source, 5 is the circular opening for the light beam, 6 is the lens, 7 through 9 are the light beam, 12 is the electrical wire, 13-(1) through 13-(n) are light receiving plane, 14 is the optical fiber, 15-(1)through 15-(n) are the cross sections of the optical fiber, 16-(1) through 16-(n) are cells of the beam sensor, 17 is the damping means.

In the stationary condition, the pendulum 1 is supported vertically by the spring 3 as shown in FIG. 4(A). The light beam 7 from the light source 4 passes through the circular opening 5, and the light beam 8 which is the output of the opening 5 is applied to the lens 6. The light beam 9 from the lens 6 is focused on the light receiving plane 13-(1) through 13-(n), thus, the real image of the circular opening 5 is provided on the light receiving plane. In the stationary condition, the pendulum stands vertically, and the light beam 9 illuminates the center of the light receiving plane 13-(1) through 13-(n).

When there is an earthquake or any other vibration, a relative movement occurs between the pendulum 1 and the housing 2 according to the horizontal components of the vibration. As the damping means 17 is provided to damp the movement of the pendulum, the movement of the pendulum 1 reflects accurately the movement of the earth. Further, the damping means 17 limits the amplitude of the vibration of the pendulum. When the pendulum is vibrating as shown in FIG. 4(B), the light beam 9 illuminates the side portion of the light receiving plane 13-(d1) through 13-(n) instead of the center portion of the same. Since the optical fiber 14 is projected upwardly on the pendulum 1, the movement of the light receiving plane 13-(1) through 13-(n) which is one end of the optical fiber 14 is larger than that of the pendulum 1, thus the sensitivity of the vibration is amplified. The other end of the optical fiber 14 is the cross section 15-(1) through 15-(n), to which the cells of the beam sensor 16-(1) through 16-(n) are optically connected.

Figures 5A, 5B, 5C:
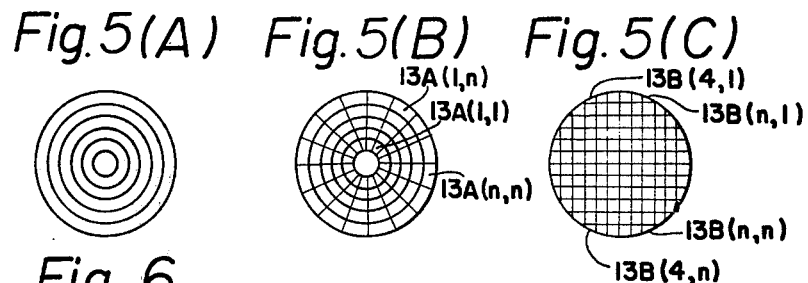
FIG. 5(A), 5(B) and FIG. 5(C) show some embodiments of the arrangement of the cells of the beam sensor according to the present invention.

FIG. 5(A), FIG. 5(B) and FIG. 5(C) show some embodiments of the arrangement of the cells of the sensor. In FIG. 5(A), the light receiving plane 13-(1) through 13-(n) are divided into a plurality of annular rings and the center circle by a plurality of concentric circles. The center circle 13-(1), the first annular ring 13-(2), and the most outer ring 13-(n) confront the cells 16-(1), 16-(2) and 16-(n), through the cross sections 15-(1), 15-(2), through 15-(n) of the optical fiber. Accordingly, in the stationary condition, the light beam 9 illuminates the center 13-(1) of the light receiving plane of the optical fiber 14, and said light beam illuminates the cell 16-(1) of the sensor through the cross section 15-(1). When a vibration deflects the light beam 9, said light beam illuminates one of the concentric annular rings 13-(2) through 13-(n). The light travels through the optical fibers 14 which are located in the illuminated annular ring, and into the corresponding bundle 15-(2) through 15-(n) and then, the corresponding cells 16-(2) through 16-(n) is illuminated. It should be appreciated that the center circle 13-(1) and the annular rings 13-(2) through 13-(n) are symmetrical in relation to the center of the light receiving plane, and any direction of vibration in the horizontal plane deflects the light beam 9 to one of rings 13-(2) through 13-(n).

FIG. 5(B) shows another arrangement of the cells in which the light receiving plane is divided by both the concentric circles and a pluarlity of radial lines thereby dividing the plane into a plurality of areas 13A-(1,a) through 13A-(n,n). A cell 16A-(n,n) is connected to the optional fiber from each area. Each cell 16A-(n,n) has a magnitude and cirection associated with it.

FIG. 5(C) is still another arrangement of the cells in which the light receiving plane is divided by a plurality of perpendicular cross lines. It should be noted that, using the arrangement of FIG. 5(B) and/or FIG. 5(C), not only the intensity of the vibration but also the direction of the same can be measured. Magnitude and direction can be detected in the embodiment of FIG. 5(C) in a manner similar to FIG. 5(B).

Figure 6:
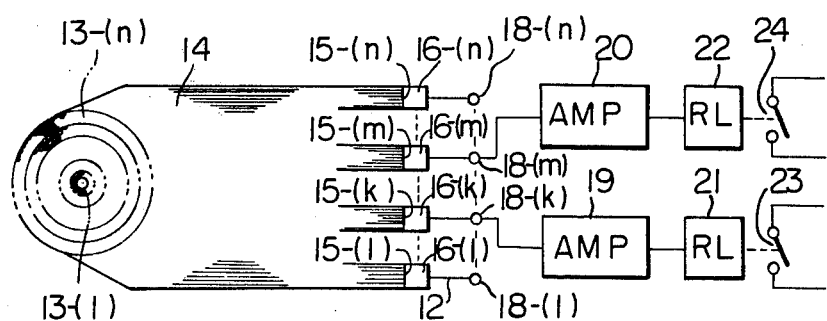
FIG. 6 shows the electrical circuitry for use with the present vibration detector.

FIG. 6 shows the electrical circuit for use with the present vibration detector. The outputs of the cells of the sensor (16-(1) through 16-(n)) are provided to the terminals 18-(1) through 18-(n), through the wire 12. FIG. 6 is the embodiment that two threshold levels are set for detecting the vibration. In FIG. 6, the terminal 18-(k) is connected to the amplifier 19, and the terminal 18-(m) is connected to the amplifier 20. It should be appreciated that any other terminals can be connected to other amplifiers to provide more threshold levels. When a vibration, the intensity of which is sufficient to provide an electrical signal at the terminal 18-(k) occurs, said electrical signal is applied to the relay 21 through the amplifier 19, thus the contact 23 of the relay 21 is closed and a vibration larger than the first threshold level is indicated. Further, when a vibration, the intensity of which is sufficient to provide on electrical signal at the terminal 18-(m) occurs, the electrical signal is applied to the relay 22 through the amplifier 20, thus the contact 24 of the relay 22 is closed, and a vibration larger that the second threshold level is indicated. Threshold levels are selected by connecting an amplifier to a terminal 18n. Thus when vibrations have a magnitude sufficient to move the light beam to a corresponding ring 13n the vibration will be detected and that level of vibration becomes a threshold level or set point.

The light source 4 in FIG. 4(A) and FIG. 4(B) can be for instance a tungsten filament lamp, an LED (light emitting diode) or a laser. When the light source is an LED or a laser, the sensor (16-(1) through 16-(n)) must be an photoelectric convertor in which the most sensivive spectrum coincides with that of the light source.

It should be appreciated that although the inverted pendulum is shown in the embodiment, a suspended pendulum is also useable in the present invention.

Figure 7A:
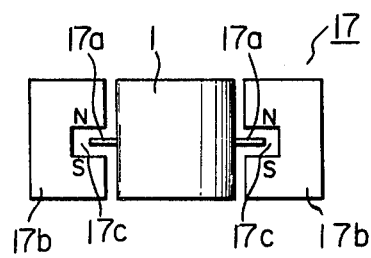
FIG. 7(A) and FIG. 7(B) show the structure of the damping means utilized in the present vibration detector.
Figure 7B:
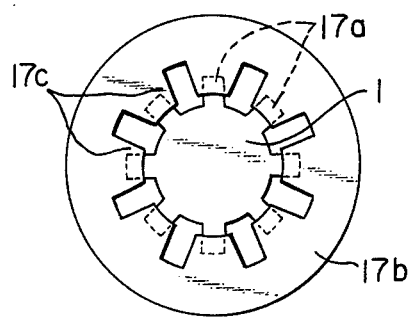

FIGS. 7(A) and FIG. 7(B) show the structure of the damping means 17. In the figures, the reference numeral 1 is the pendulum, 17a is the conductive plate connected to the pendulum 17, 17b is the yoke of a magnet, 17c is a gap between a pair of magnetic poles (N and S). When the pendulum is in the stationary condition, the conductive plate 17 stands at the center of the gap 17c. However, when the pendulum 1 vibrates the conductive plate 17a moves in the gap 17c where the magnetic field is present. Therefore, the movement of the conductive plate 17a causes the generation of eddy currents in the ring 17. Since the eddy currents consume the energy of the vibration of the pendulum, the movement of the pendulum is damped or braked.

It should be appreciated that any other damping means is possible to those skilled in the art. For instance, the pendulum can be submerged in oil for damping purposes.

Now, the second embodiment of the present invention will be explained in accordance with FIG. 8(A) and FIG. 8(B). In those figures, the reference numerals 1 through 9 indicate the same members as those in FIGS. 4(A) and 4(B) with that light beam 9 having a parallel portion 9a, and the reference numeral 10 is a light beam, 11 is a lens frame, 11a is a condenser lens, 16 is a beam sensor having a plurality of cells, and 17 is a damping means. It should be appreciated of course that the beam sensor 16 has a plurality of cells which are arranged as shown in one of FIGS. 5(A), 5(B) and 5(C). The important difference between the embodiments in FIGS. 4(A) and 4(B), and FIGS. 8(A) and 8(B) is that the light source is fixed at the housing and the sensor is mounted in the pendulum in the former embodiment, while the light source is mounted in the pendulum, and the sensor is fixed at the housing in the latter embodiment.

The bob of the pendulum 1 is held by the supporting springs 3. In the hollow of the bob 1, the illuminator or the light source 4 is mounted. The sensor 16 is mounted on the ceiling of the housing 2 directly opposite the illuminator 4. Between the sensor 16 and the illuminator 4 are interposed the condenser lens 11a and the lens 6 as well as the circular opening 5. Both the condenser lens 11a and the circular opening 5 are mounted in the hollow of the bob 1. The condenser lens 11a is held by the lens frame 11 fitted to the housing 2. The sensor 16 is provided with multiple numbers of cells being independent of one another and arranged in a pattern shown in one of FIGS. 5(A), 5(B) and 5(C). Each of these cells are provided with output connections, two of such connections being 18-(k) and 18-(m). And, to the output connections of these amplifiers 19 and 20 are connected the relay 21 and 22 (FIG. 6).

Figure 8A:
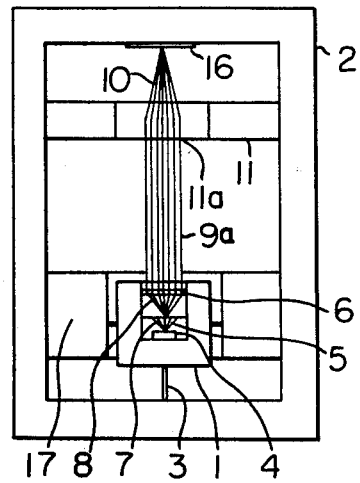
FIG. 8(A) and FIG. 8(B) show another structure of the vibration detector according to the present invention.
Figure 8B:
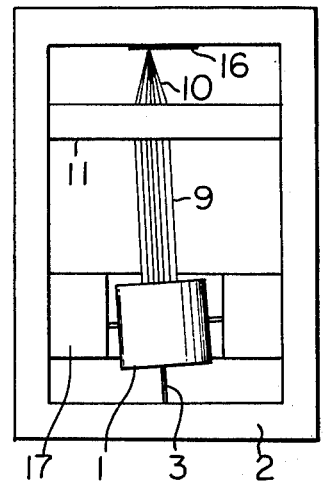

Because the pendulum bob 1 is standing upright in the stationary condition, the flux of light 10 is projected on the central part of the sensor 16 (FIG. 8(A)).

With a tremor of the earth, relative motion between the pendulum bob 1 and the housing 2 corresponding to the horizontal component of the earthquake motion is generated. By virtue of the damper this motion almost faithfully translates horizontal movements of the ground. The damper 17 restrains excess oscillation of the pendulum bob 1.

As already mentioned, the flux of light is projected on the central part of the sensor 16 in the stationary condition. If the condition is such as shown in FIG. 8(B), the projection of the flux of light 10 on the sensor 16 is skewed. Since the sensor 16 is composed of circular sensors arranged in the pattern of FIGS. 5(A) through 5(C) and independent of one another, the light beam projected, but skewed from the center because of the earthquake motion, is projected on any one of the multiple cells. The cells are point symmetrical to the center of the sensor 16, and thus the amplitude of the horizontal vibration of the earthquake motion is identical, regardless of the direction of the vibration of the earth within horizontal plane.

Electrical connections from each individual cell are extended through the sensing head as shown in FIG. 6.

Figure 9A:
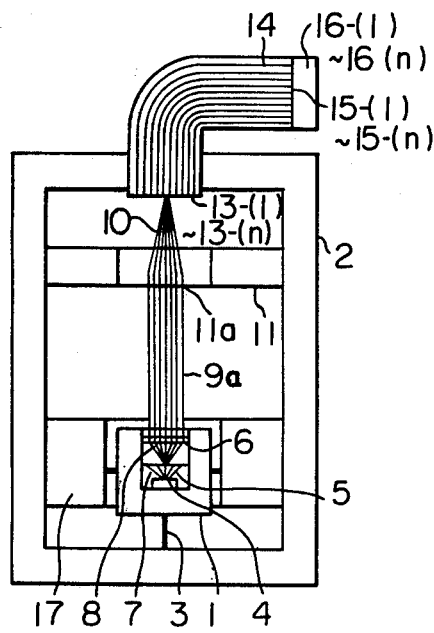
FIG. 9(A) and FIG. 9(B) show still another structure of the vibration detector according to the present invention.
Figure 9B:
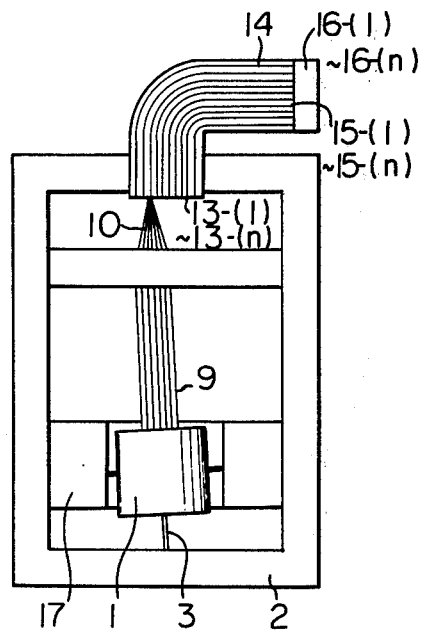

FIGS. 9(A) and 9(B) show another embodiment of the present vibration detector, in which FIG. 9(A) shows the stationary condition and FIG. 9(B) shows the vibrating condition. The same reference numerals in the FIGS. 8(A) and 9(B) show the same members as those in the previous embodiments. The structure and operation in FIGS. 9(A) and 9(B) are the same as those in FIGS. 8(A) and 8(B) except that the optical fiber 14 is provided before the sensor 16 in FIGS. 9(A) and 9(B). Due to the presence of the optical fiber 14, the embodiment in FIGS. 9(A) and 9(B) is easy to manufacture and to operate.

It should be appreciated of course that the electrical circuit in FIG. 6, the arrangement shown in FIGS. 5(A) through 5(C), and the structure of the damping means in FIG. 7 can be applicable to the embodiments in FIGS. 8(A) and 8(B), and FIGS. 9(A) and 9(B).

As described above, the vibration detector of this invention is capable of detecting whether the composite value of two components in the composite vibration has reached the set point or not. Thus, a single detector performs functions which two sets of conventional type detectors perform.

Because detection is performed optically, the set point may be readily altered and in addition, multiple set points can be established by merely activating selected detectors. This device may be used as a vibration detector merely for detecting whether horizontal maximum acceleration of an earthquake movement has reached the set point or not. Furthermore, it may be used as an inclinometer to detect whether the inclination of the platform on which the vibration detector is installed has reached the set point or not.

From the foregoing it will now be apparent that a new and improved vibration detector has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A vibration detector comprising a stationary housing, a pendulum vibratably mounted in said housing, a bundle of optical fibers fixed vertically on said pendulum and having a light receiving plane on the upper cross section of the same, a beam sensor having a plurality of cells arranged on said pendulum, a light source mounted in said housing for illuminating said upper section of said fibers, an optical means for focusing the light beam from said light source on said optical fibers, and each cell of said beam sensors being arranged to provide an electrical signal according to the point that the light beam illuminates depending upon the vibration of said pendulum.

2. A vibration detector according to claim 1, wherein said bundle of fibers is classified into a plurality of sections having a center circle and a plurality of annular rings, and each section is arranged to illuminate the cell of said beam sensor.

3. A vibration detector according to claim 1, wherein said bundle of fibers is classified into a plurality of sections having a center circle and a plurality of annular arcs and each section is arranged to illuminate the cell of said beam sensor.

4. A vibration detector according to claim 1, wherein said bundle of fibers is classified into a plurality of perpendicular lines and each section is arranged to illuminate the cell of said beam sensor.

5. A vibration detector according to claim 1, further comprising a means for damping the vibration of the pendulum.

6. a vibration detector comprising a stationary housing, a pendulum vibratably mounted in said housing, a light source mounted in said pendulum, an optical means for providing parallel beams of light from the output of said light source, another optical means fixed at said housing for focusing said parallel light beams on the end of said housing, a beam receiving plane provided at said end of the housing, a beam sensor having a plurality of cells connected to said beam receiving plane, and each cell of said beam sensor being arranged to provide an electrical signal according to the illumination by the beam relating to the vibration of said pendulum.

7. A vibration detector according to claim 6, further comprising a bundle or optical fibers between said beam receiving plane and said beam sensor for guiding the light beam from said beam receiving plane to said beam sensor.

8. A vibration detector according to claim 6, wherein said pendulum is an inverse pendulum.

* * * * *